No. 871,354. PATENTED NOV. 19, 1907.
J. C. MORGAN.
PLANTER.
APPLICATION FILED MAR. 12, 1907.

3 SHEETS—SHEET 2.

WITNESSES:
E. F. Stewart
Hubert D. Lawson

John C. Morgan, INVENTOR.
By C. A. Snow & Co.
ATTORNEYS

No. 871,354.  
PATENTED NOV. 19, 1907.  
J. C. MORGAN.  
PLANTER.  
APPLICATION FILED MAR. 12, 1907.

3 SHEETS—SHEET 3.

John C. Morgan,  
INVENTOR.

WITNESSES:  
By C. A. Snow & Co.  
ATTORNEYS

UNITED STATES PATENT OFFICE.

JOHN C. MORGAN, OF POLK COUNTY, NORTH CAROLINA.

PLANTER.

No. 871,354.      Specification of Letters Patent.      Patented Nov. 19, 1907.

Application filed March 12, 1907. Serial No. 361,955.

*To all whom it may concern:*

Be it known that I, JOHN C. MORGAN, a citizen of the United States, residing in the county of Polk and State of North Carolina, have invented a new and useful Planter, of which the following is a specification.

This invention relates to planters and its object is to provide a device of this character having one or more receptacles for containing material to be dropped, each of said receptacles having novel means for directing material therefrom in desired quantities.

A still further object is to provide simple means for stopping the discharge of material.

Another object is to provide means constantly under the control of the operator whereby the discharge of material from either receptacle can be increased or diminished without stopping or changing the movement of the machine.

Another object is to provide mechanism whereby seed and fertilizer may be dropped in any desired proportions.

A still further object is to provide a receptacle so constructed as to enable the same to be used either for holding seed or fertilizer.

With these and other objects in view the invention consists of certain novel features of construction and combinations of parts which will be hereinafter more fully described and pointed out in the claims.

In the accompanying drawings is shown the preferred form of the invention.

Figure 1:
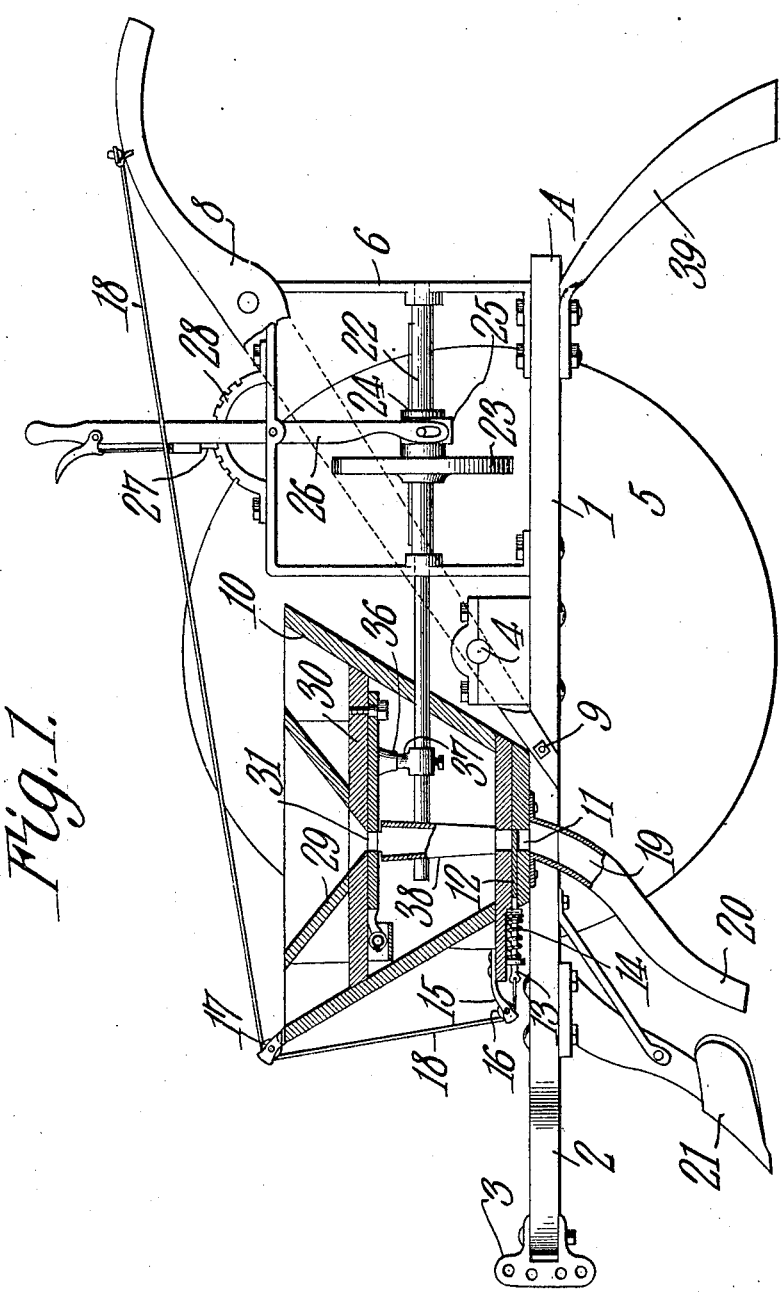
Figure 2:
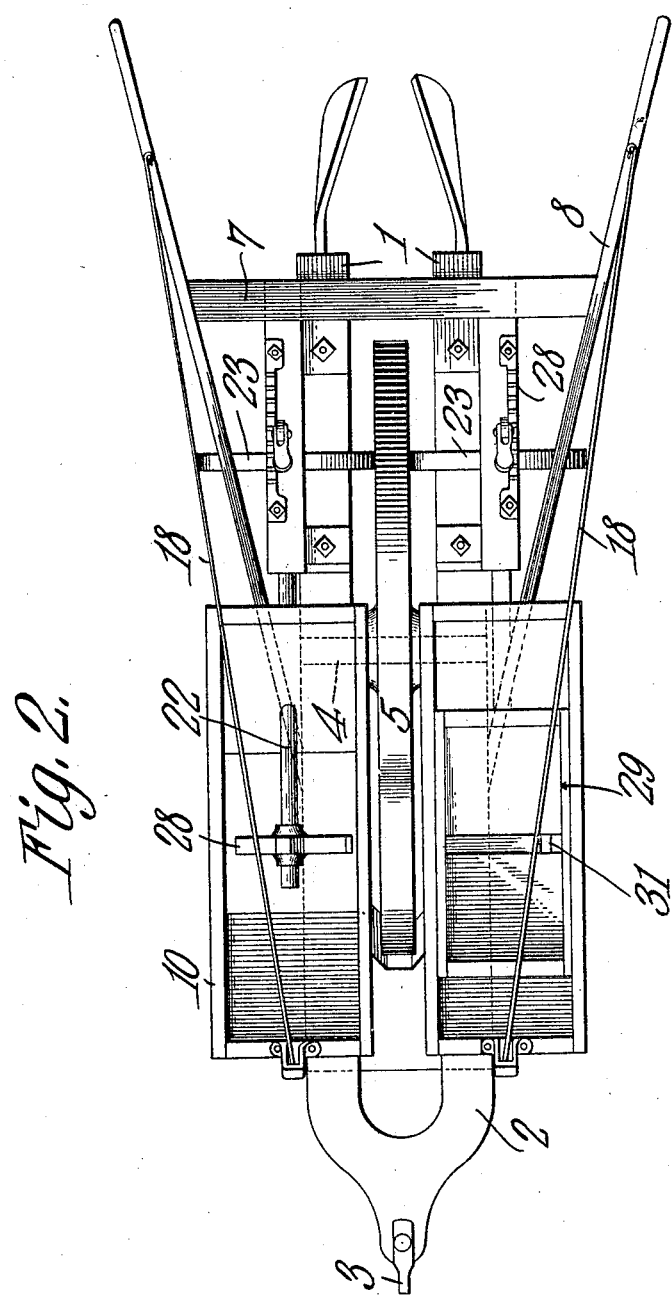
Figure 3:
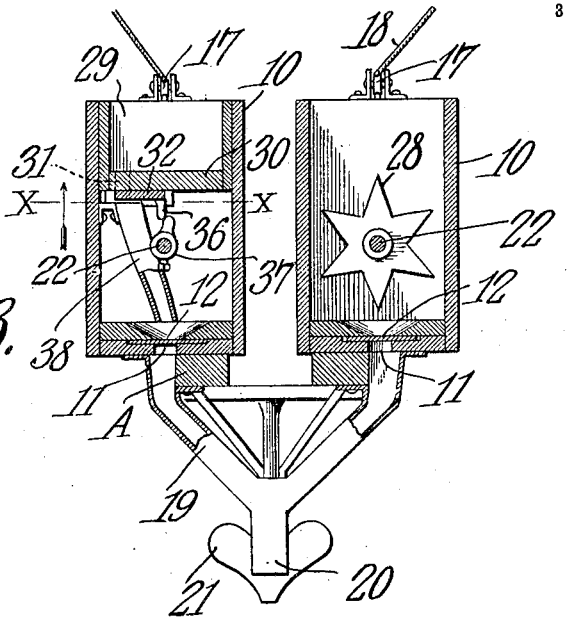
Figure 4:
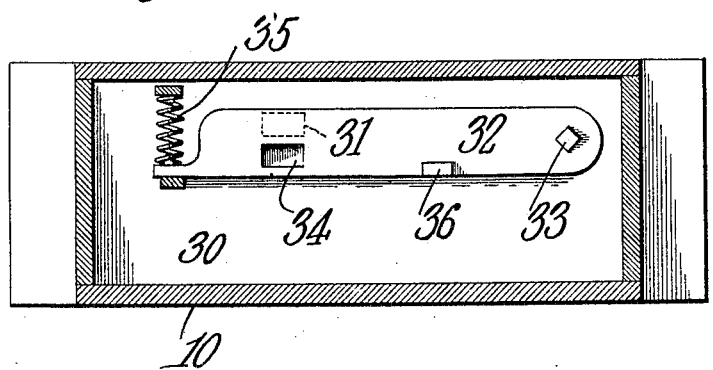

In said drawings: Figure 1 is a view partly in side elevation and partly in section of the complete machine; Fig. 2 is a plan view; Fig. 3 is a transverse section through the receptacles; and Fig. 4 is an enlarged section on line x—x, Fig. 3.

Referring to the figures by characters of reference, A is the frame of the machine the same being made up of side strips 1 connected at their forward ends by a casting 2 to which the clevis 3 is connected. A shaft or axle 4 is journaled upon the side strips 1 near the center thereof and mounted thereon is a disk 5 constituting the supporting wheel of the machine. Secured upon the rear portion of the side strips 1 is an upstanding supporting frame 6 and the two frames are connected by a cross strip 7 to which are fastened handles 8. These handles extend downward and are fastened to the side strips 1, as shown at 9. Secured to and extending laterally from each of the side strips 1 is a receptacle 10 having a passage 11 through the bottom thereof and normally closed by a slide 12 which is mounted to be reciprocated within the bottom of the receptacle. This slide is provided with a stem 13 on which is arranged a spring 14 designed to hold the slide normally closed. A bracket 15 extends forward from the bottom of the receptacle 10 and carries a pulley 16, and another pulley 17 is mounted upon the top of the front portion of the receptacle 10. Arranged on these pulleys is an actuating cord 18, one end of which is fastened to the stem 13 while the other end is connected to one of the handles 8. An outlet tube 19 is fastened to the bottom of each of the receptacles 10 and the two tubes converge and open into a common outlet 20 which is suspended in rear of the furrow opener 21.

Journaled in each of the supporting frames 6 is a longitudinally extending shaft 22 on which is feathered a friction disk 23 having a hub 24 which is loosely engaged by a collar 25. This collar is engaged by one end of a lever 26 fulcrumed upon the supporting frame 6 and having a dog 27 disposed to engage a toothed sector 28 whereby the lever can be locked in any position to which it may be adjusted. The two friction disks 23 are disposed normally in contact with opposite faces of the supporting disk 5 and it is obvious that by shifting the disks 23 longitudinally along their shafts their speed of rotation can be increased or diminished as desired. Both of the shafts 22 extend into the receptacles 10 and above the outlet openings 11 in the bottoms thereof.

If either or both of the receptacles is to be used for containing fertilizer a star wheel 28 is fastened to that end of the shaft within the receptacle so that when the wheel is rotated it will force the contents of the receptacle toward the outlet opening 11. If, however, one of the receptacles is to be used for containing seeds an auxiliary hopper is used in connection therewith. As shown particularly in Fig. 1 this auxiliary hopper 29 extends upward from a base strip 30 designed to fit snugly within the receptacle 10 and an opening 31 is formed within the bottom of the hopper and is normally closed by a valve 32. This valve is in the form of a strip pivoted at one end, as shown at 33, to the strip 30 and having an opening 34 designed to register with the outlet opening 31. A spring 35 bears against one end of the strip 32 so as to hold the two openings 31 and 34 normally out of register. A finger 36 extends downward from the strip 32 and into the path of a tappet 37 secured to the shaft 22. A tube 38 is secured upon the bottom of the receptacle 10 and around the opening 11 and extends upward to a point directly below the outlet 31 so as to receive material discharged from the hopper 29.

In the drawings the machine has been shown arranged to drop seed and fertilizer at the same time. The seed is placed within the hopper 29 and the fertilizer is placed in the opposite receptacle 10. When the two slides 12 are closed it is impossible for any of the contents of the two receptacles to enter the tubes 11. By pulling on the cords 18, however, the slides can be drawn forward from the openings 11 and against the tension of their springs so as to permit material to freely pass into the tubes 11. The star wheel 28 will, as before stated, direct the fertilizer into the outlet opening thereunder and the rotating tappet 37 will strike the finger 36 and cause the strip 32 to oscillate so as to cause the openings 31 and 34 to register once during each rotation of the shaft 22. Each time the openings register one or more seeds drop therethrough into the tube 38 and are directed into the tube 19. As the disks 23 receive their motion from the disk 5 it is apparent that by adjusting these disks toward or from the center of the supporting disk 5 the speed of rotation of the two shafts 22 can be varied to suit different conditions. The plow 21 of course opens the furrow so that the seed and fertilizer can be drpped therein, and covering plows 39 are connected to the rear portion of the frame 6 so as to cover seed after they have been deposited.

It is to be understood that instead of placing the seed in one of the receptacles and fertilizer in the other receptacle either seed or fertilizer can be placed in both of said receptacles. Also instead of mounting two receptacles upon the frame A the same may be provided with one or more receptacles.

It will be seen that the machine is of a very compact nature, can be readily manipulated, and that by reason of the mechanism disclosed, the dropping of the contents of the receptacles is under the absolute control of the operator and can be increased or diminished or entirely cut off whenever it is so desired.

What is claimed is:

1. The combination with a portable receptacle having an outlet; of a supplemental hopper detachably mounted within the receptacle and having an outlet, a valve normally closing the outlet, and mechanism operated by the movement of the machine for actuating the valve at predetermined periods.

2. In a machine of the character described the combination with a portable receptacle having an outlet; of a supplemental hopper detachably mounted upon the receptacle and having an outlet, a valve for normally closing the outlet of the hopper, means for conducting material from said outlet to the outlet of the receptacle, and rotatable means operated by the movement of the machine for actuating the valve at predetermined periods.

3. In a machine of the character described the combination with a supporting disk and a receptacle having an outlet; of a supplemental hopper within the receptacle and having an outlet, an oscillatory valve for said outlet, rotatable means for actuating the valve, and a friction element engaging with and adjustable upon the disk for actuating said rotatable device.

4. In a machine of the character described the combination with a supporting disk and a receptacle having an outlet; of a supplemental hopper detachably mounted within the receptacle and having an outlet, a spring controlled valve for closing said outlet, a shaft, means movable therein for actuating the valve, and a friction element feathered upon the shaft and engaging with and slidable upon the supporting disk.

5. In a machine of the character described the combination with a portable receptacle having an outlet, dropping mechanism, and means operated by the movement of the receptacle for operating said mechanism; of a spring pressed slide normally closing the outlet, flexible means connected to the slide for drawing it away from the outlet.

6. In a machine of the character described the combination with a supporting disk, and receptacles having outlets; of shafts at opposite sides of the disk and parallel with the facts thereof, a friction element adjustably mounted upon each shaft and engaging and disposed to be actuated by the disk, means for independently shifting said elements, and separate means within the hopper and actuated by the respective shafts for directing material toward the outlets of the receptacles.

In testimony that I claim the foregoing as my own, I have hereto affixed my signature in the presence of two witnesses.

JOHN C. MORGAN.

Witnesses:
T. E. WALKER,
F. M. BURGESS.